Feb. 21, 1939.  W. T. DUNN  2,147,737
DRIVING MECHANISM
Filed Jan. 18, 1934   4 Sheets-Sheet 2

INVENTOR.
William T. Dunn.
BY
Harness, Lind, Patee & Harris
ATTORNEYS.

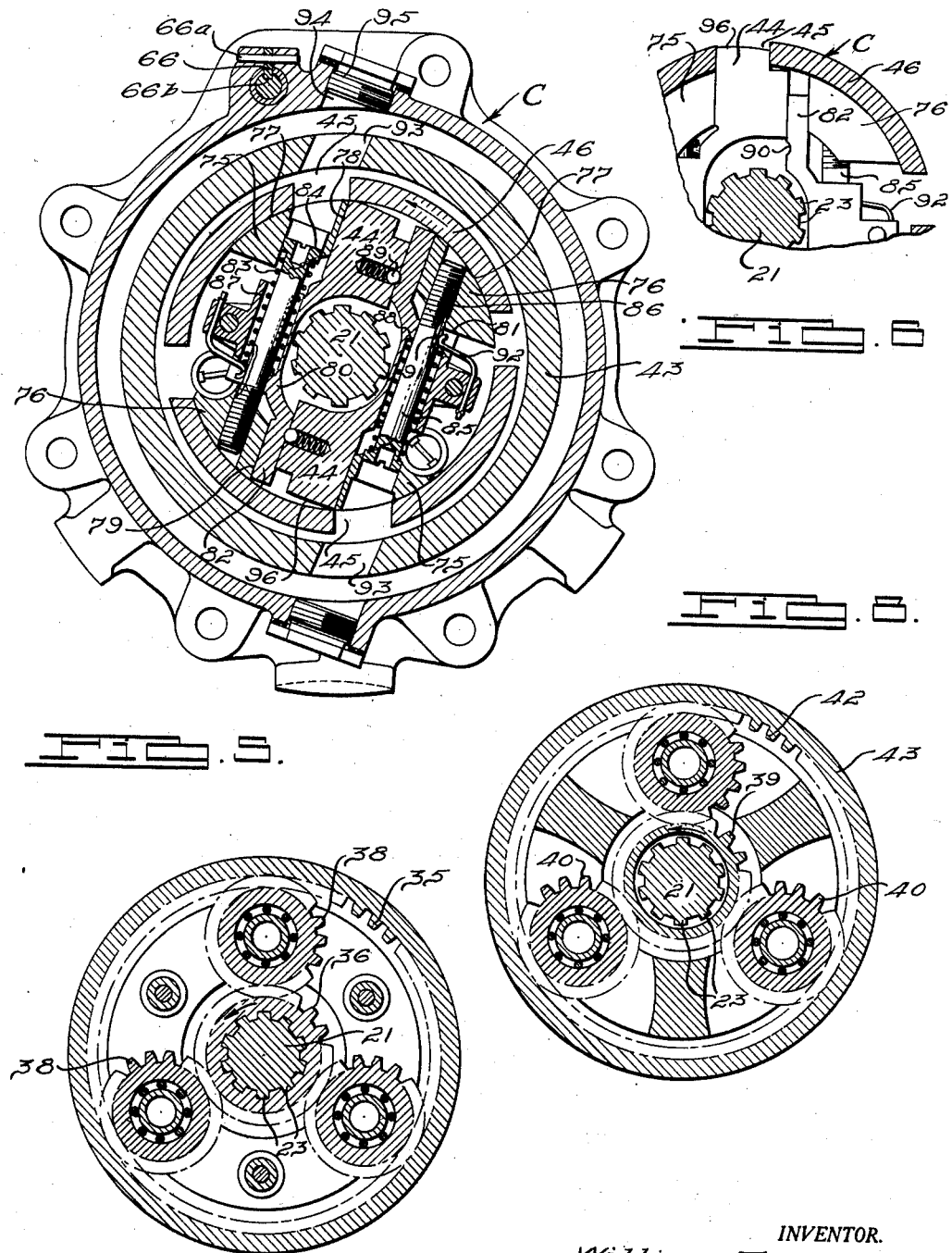

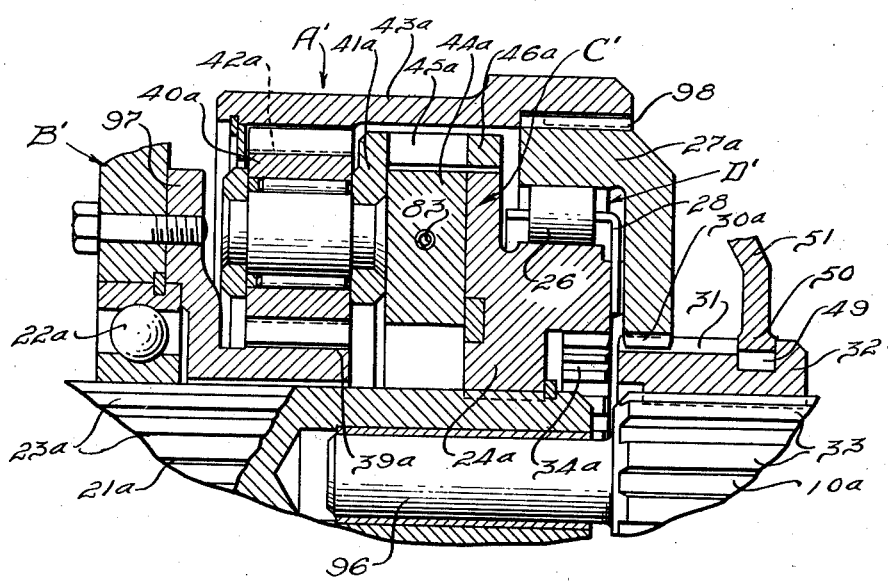

Patented Feb. 21, 1939

2,147,737

UNITED STATES PATENT OFFICE 2,147,737

DRIVING MECHANISM

William T. Dunn, Detroit, Mich., assignor to Chrysler Corporation, Detroit, Mich., a corporation of Delaware Application January 18, 1934, Serial No. 707,048

53 Claims. (Cl. 74—260)

This invention relates to driving mechanisms and refers more particularly, in one embodiment thereof, to improvements in driving mechanisms for motor cars or vehicles, especially where it is desired to vary the driving speed ratio between the vehicle engine or prime mover and the propelling ground wheels.

One object of my invention resides in the provision of an improved driving mechanism adapted, under predetermined desired conditions, to automatically effect the drive for the vehicle. My driving mechanism is preferably adapted for use in connection with a speed ratio changing transmission of any desired type, and is adapted to establish an auxiliary driving speed ratio for the vehicle, such as an overdrive ratio, for example.

A further object of my invention resides in the provision of an improved driving or speed ratio changing mechanism adapted to automatically respond in its actuation to predetermined desired conditions of operation of the vehicle. Thus, by way of example, I have provided an overdrive which is automatically effective when the vehicle attains a predetermined speed so that, on reaching this critical speed, the overdrive becomes effective and on falling below this critical speed the overdrive becomes ineffective.

In carrying out the aforesaid objects of my invention I have provided an improved form and arrangement of an auxiliary driving mechanism which, where an overdrive speed ratio is desired for the vehicle, is driven, when inoperative as a drive, at a speed less than that of a shaft or other part cooperating therewith and driven from the engine. Ordinarily, I prefer to arrange my auxiliary driving mechanism between driving or driven shafts or other parts respectively responsive in their actuation to the speed of the engine and vehicle driving speeds, the auxiliary driving mechanism being thus driven, when inoperative, from the driven shaft and at a speed less than that of the driving shaft by the amount or ratio of overdrive desired.

In order to effect the aforesaid automatic engagement and disengagement of the drive through the auxiliary driving mechanism, I have provided a clutch which will automatically connect and release the clutch control parts of the auxiliary drive under predetermined desired conditions of relative speeds of the engine and vehicle, or driving and driven shafts. This automatic clutch is preferably of the type having a cage or core carrying one or more pawls or dogs responsive to centrifugal force at the desired critical speed for movement of the pawls into clutching relationship with a cooperating companion clutch member or shell formed with suitable pawl engaging slots or openings, the pawl carrying cage being driven with either the engine driving shaft or the vehicle driven shaft, and the slot carrying shell being driven with the other of these shafts. If desired, other types of clutches may be used to control the auxiliary driving mechanism within the broader aspects of my invention.

A further object of my invention resides in the provision of what may be termed primary driving means in addition to said auxiliary driving mechanism for driving the vehicle independently thereof, and in an improved form and arrangement, said means preferably being under manual control so that the drive may be established independently of the auxiliary drive and automatic clutch associated therewith. The primary driving means may thus provide the normal driving medium between the engine and vehicle drive either throughout the entire speed range of the vehicle or up to the aforesaid critical speed at which time the automatic clutch transfers the drive to and through the said auxiliary driving mechanism.

Another object of my invention resides in the provision of an auxiliary driving mechanism occupying a relatively small space and being simple in construction, quiet in operation and capable of manufacture at relatively small cost. Thus, according to one aspect of my invention, I have provided an improved form and arrangement of auxiliary driving mechanism embodying one or more sets of planetary gears intermediate the power driving shaft and the driven shaft, the planetary gearing driving one of the clutching parts of the automatic clutch. A further feature of this phase of my invention in one embodiment thereof resides in the provision of a drive for the planetary gearing of the auxiliary driving mechanism from both the driving and driven shafts whereby a wide range of auxiliary driving ratios may be provided without increasing the sizes of the planetary gears undesirably. Thus, I have provided a pair of planetary gear sets, the sun gear of one set being driven from either the driving or driven shafts through the other planetary gear set. In another embodiment of my invention I have illustrated the manner in which the auxiliary driving mechanism is embodied in a single planetary gear set.

A still further object of my invention resides in the provision of an improved form and arrangement of overrunning or free wheeling clutch as a part of the aforesaid primary driving means. With such novel arrangement, the vehicle may overdrive the engine, the auxiliary and primary drives and parts associated therewith being arranged so that when engagement of the automatic clutch takes place to drive the vehicle through the auxiliary driving mechanism, the overrunning clutch is preferably thereby rendered simultaneously ineffective, the overrunning clutch and primary driving means being automatically effective when the automatic clutch releases its drive, as when the vehicle speed drops below the predetermined desired critical speed.

Another object of my invention resides in the provision of improved means responsive to manually controlled manipulation of the said speed ratio changing transmission into the transmission setting for reversing the normal direction of vehicle drive, for automatically locking out or rendering the said overrunning clutch ineffective, this means being preferably in addition to the aforesaid manually controlled means for the overrunning clutch or automatic clutch or both as may be desired in any particular installation.

Further objects of my invention reside in the provision of an improved driving mechanism and in the novel combination and arrangement of parts thereof more particularly hereinafter described and shown in several detailed embodiments in order to illustrate the details and principles of my invention, reference being had to the accompanying drawings in which:

Fig. 5 is a sectional view through my auxiliary driving mechanism and automatic clutch, the latter being shown disengaged, the section being taken along the line 5—5 of Fig. 1.

Fig. 6 is a fragmentary somewhat diagrammatic view of the automatic clutch shown in Fig. 5, the clutch being shown in the engaged position.

Fig. 7 is a sectional elevational view through one of the planet gear sets of the auxiliary driving mechanism of Fig. 1, the section being taken along the line 7—7 of Fig. 1.

Fig. 8 is a sectional elevational view through the other planetary gear set of Fig. 1, the section being taken along the line 8—8 of Fig. 1.

Fig. 9 is a sectional elevational view of a portion of a modified form of my auxiliary driving mechanism wherein a single planetary gear set is used.

Fig. 10 is a like view illustrating a further modified embodiment of my auxiliary driving mechanism wherein a plurality of planetary gear sets are embodied.

Figure 1:
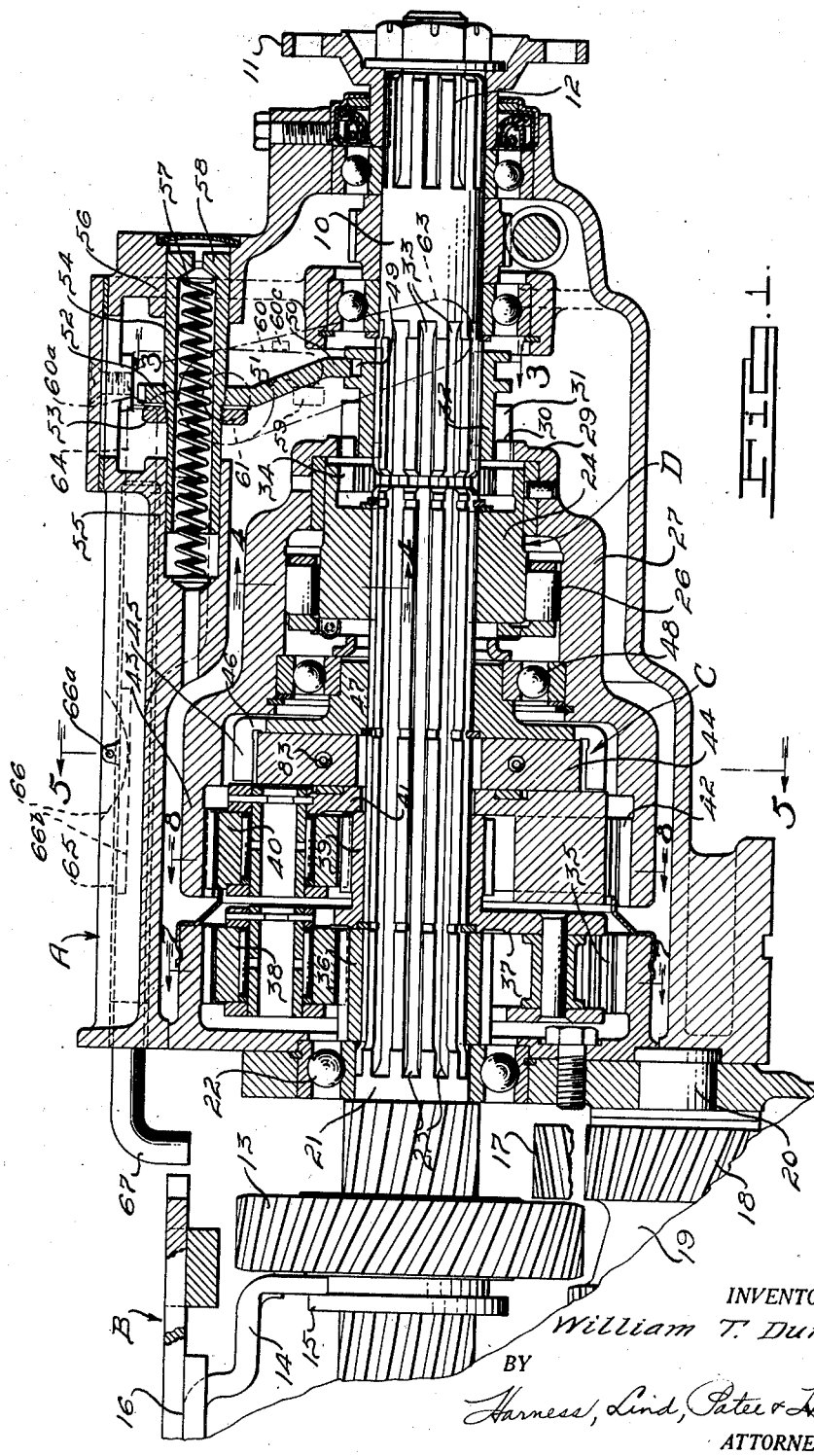
Fig. 1 is a sectional elevational view through my power driving mechanism.

In the drawings, I have illustrated my driving mechanism A interposed between a speed ratio changing transmission B and the driven shaft 10, the latter extending rearwardly to drive the rear wheels (not shown) of the motor car or vehicle in the usual well-known manner, it being understood that I have elected to show my invention in association with a motor vehicle drive, although my invention in its broader aspects is not necessarily limited thereto. Furthermore, my driving mechanism may be used to advantage at various other points in the line of general power transmission between the vehicle engine and the driven wheels, or between driving and driven means such as shafts of other types of devices. If desired, shaft 10 may transmit its drive through the usual propeller shaft brake drum by connection with a flange 11 driven by splines 12 on the driven shaft 10.

The transmission B may be of any suitable type such as the conventional selector type operated in the well-known manner through the usual selector controls whereby the various adjustments may be made to the transmission in order to provide the speed ratios in the line of drive through the transmission.

Figure 2:
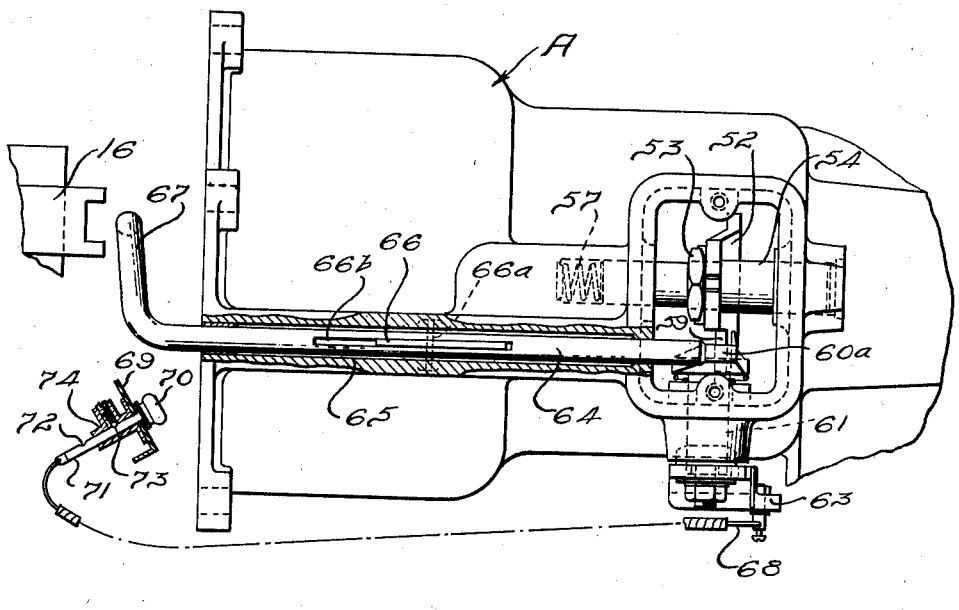
Fig. 2 is a plan view of my driving mechanism, a portion of the casing being removed to illustrate the manual controlling mechanism.

Inasmuch as transmission B may for the most part be of general conventional construction and operation, I have shown only a portion of the gearing and controls of this transmission in Figs. 1 and 2 wherein 13 represents the gear adapted to be shifted by arm 14 and collar 15 associated therewith, arm 14 being actuated by the reverse selector control 16 to shift the gear 13 to the right as viewed in Fig. 1 for engagement with the usual reverse idler gear 17 in order to effect a reverse drive from the normal direction of drive to the driven shaft 10. The idler gear 17 is in constant mesh with the driving reverse gear 18 of the transmission countershaft 19, the latter having a bearing 20 in the casing of the transmission. Thus, by appropriate actuation of the usual gear shift lever (not shown) gears 13 and 17 may be engaged so as to reverse the drive, it being understood that other manipulations of the gear shift lever are adapted to selectively produce other desired speed ratio changes in the normal direction of rotation for driven shaft 10.

The power coming from the usual engine or other prime mover forwardly of transmission B, drives the transmission and the power is taken from this transmission by a power driving means or shaft 21 rotatable in a bearing 22, the shaft having a portion extending rearwardly into the driving mechanism A, this extending portion of the shaft being provided with splines 23.

My driving mechanism A provides, among other things, an auxiliary driving means or mechanism between the driving and driven shafts 21 and 10 respectively, this driving means being preferably of a construction adapted to provide a speed ratio between the shafts of an overdriving character whereby driven shaft 10 may, under certain conditions hereinafter described, be driven from the driving shaft at a speed greater than a direct drive between the shafts, it being understood that the engine will in such instances be relatively slowed down with respect to its normal speed of actuation for a given speed of vehicle travel. If desired, the mechanism A may be arranged to provide an underdrive instead of an overdrive, although I prefer to arrange the gearing for an overdrive of the driven shaft 10.

Figures 3, 4:
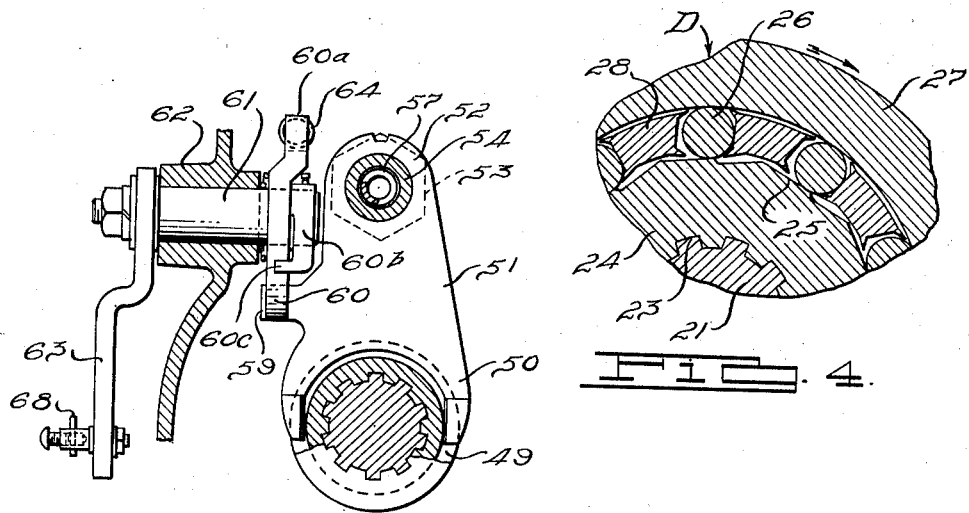
Fig. 3 is a detailed sectional elevational view of the manually controlled mechanism of Fig. 1, the section being taken along the line 3—3 of Fig. 1.
Fig. 4 is a sectional elevational view through a portion of the overrunning or free wheeling clutch, the section being taken along the line 4—4 of Fig. 1.

I preferably incorporate in my driving mechanism as a part of the primary driving means between driving shaft 21 and driven shaft 10, an overrunning or free wheeling clutch D best shown in Figs. 1 and 4. This clutch may in itself be of any suitable form, the illustration showing a conventional device in which the inner cam member 24 is driven by the splines 23 of shaft 21, the cam faces 25 being engaged by cylinders 26 so that by the driving rotation of shaft 21 the high sides of cam faces 25 will wedge the cylinders 26 between cam member 24 and the outer cylindrical driven member 27 of the overrunning clutch to establish a direct drive thereto. The usual spacers 28 maintain the cylinders in spaced position, it being apparent that whenever the engine or driving shaft 21 slows down, the vehicle and driven shaft 10 may, by reason of the clutch D overrun the driving shaft, other conditions permitting such action as will be presently apparent.

The cylindrical portion 27 of the overrunning clutch D is formed with a rearward extension 29 provided with an annular series of internal teeth or jaws 30 complementary to corresponding teeth 31 at all times engaged therewith, the teeth 31 being carried by the shiftable clutch controlling device 32 driven by the splines 33 of the driven shaft 10, the arrangement being such that clutch 32 while engaging teeth 31 thereof with teeth 30 may be shifted forwardly or to the left as viewed in Fig. 1 to cause teeth 31 to also engage the annular series of internal teeth 34 formed on a rear extension of cam member 24. When clutch 32 is shifted forwardly as aforesaid, driving and driven shafts 21 and 10 respectively will be connected through cam member 24 and clutch 32 so as to lock out or render the overrunning clutch D inoperative. With clutch 32 in the position shown in Fig. 1, the driving shaft 21 drives the driven shaft 10 through the members 24 and 27 of the overrunning clutch D, the drive passing from cylindrical member 27 and extension 29 thereof to the clutch 32.

Referring now particularly to Figs. 1, 7 and 8, this embodiment of my invention includes a pair of planetary gear sets, an internal gear 35 of the forward planetary gear set being fixed to the casing of the overdrive mechanism A. This gear set comprises a sun gear 36 driven by splines 23 of the driving shaft 21, and a planet carrier 37 having planet gears 38 meshing with gears 35 and 36. The planet carrier 37 has a hub forming a rotatable sun gear 39 of the rearward planetary gear set best shown in Fig. 8. This gear set has sun gear 39 free of driving engagement with shaft 21, this sun gear actuating planet gears 40 carried by planet carrier 41, gears 40 also meshing with internal gear 42 formed as a part of sleeve 43. This sleeve is a forward extension of the aforesaid cylindrical member 27 of the overrunning clutch D. A clutch C, preferably of the automatic type has its pawls 44 driven, when the clutch is disengaged, by the planet carrier 41. The pawls are adapted to engage slots 45 of the companion clutch member of shell 46. This shell has a hub 47 engaging splines 23 so as to be driven at all times from driving shaft 21. A bearing 48 is located between hub 47 and cylindrical member 27.

The clutch 32 is provided with an annular groove 49 engaged by a yoke 50 best shown in Fig. 3. This yoke extends upwardly through an arm 51 to a hub 52 fixed by a nut 53 to a shiftable rod 54 adapted to reciprocate in guides 55 and 56 provided by the casing of driving mechanism A. The rod 54 is bored out to receive a spring 57 reacting against a fixed abutment 58, this spring 57 acting to normally move rod 54 to the right, as viewed in Fig. 1, to position the parts associated therewith as illustrated in Figs. 1 and 2 of the drawings.

Arm 51 has a lateral projection 59 engaged by the downwardly extending lever 60 loosely mounted on a pivot pin 61 extending through a bearing support 62 of the casing. Fixed to the outer end of pin 60 is a downwardly extending lever 63, and fixed to the inner end of pin 61 is a lever 60$^b$ having a lateral ear 60$^c$ in the path of lever 60 when the lever 60$^b$ is swung by lever 63, the purpose of which will be presently apparent. A second shiftable rod 64 reciprocates in a guide 65, rotation thereof being prevented by a keylike member 66 fixed by a pin 66$^a$ and engaging a suitable groove 66$^b$ in rod 64 as best shown in Figs. 1, 2 and 5. Lever 60 has an upwardly extending lever portion 60$^a$ engaged by the rear end of the rod 64.

Rod 64 has a forwardly located arm 67 extending laterally inwardly of transmission B, this arm being normally spaced from reversing selector rod 16 but being adapted for engagement therewith during movement of this selector rod into its position for causing engagement of gears 13 and 17 for establishing the aforesaid reverse drive. The arrangement is such that when gear 13 is shifted as aforesaid to its position for establishing the reverse drive, arm 67 will be engaged by selector rod 16 and moved to the right as viewed in Figs. 1 and 2, thereby also moving rod 64 and swinging lever 60 on the pivot pin 61 independently of lever 63 to move arm 51, rod 54 and yoke 50 forwardly for shifting the clutch 32 along splines 33 of driven shaft 10 to lock out the overrunning clutch D by engagement of teeth 34 and 31. When selector rod 16 is restored, spring 57 acts to restore clutch 32 to the Fig. 1 position unless held in the forward position by the following device.

In addition to the aforesaid manually operated means for shifting the position of the clutch 32 in response to a setting of the reverse gearing of transmission B, I have also provided a further manually controlled means for shifting the clutch 32 independently of the movement thereof under the influence of the reverse setting of the transmission. To this end the lever 63 is adapted to be actuated by suitable linkage such as the Bowden wire 68. This wire, as diagrammatically illustrated in Fig. 2, extends for convenient manipulation by the vehicle driver, such position being indicated by the usual vehicle dash 69 which mounts a handle or knob 70 connected to the other end of the Bowden wire 68. The handle 70 is adapted for movement by the hand of the vehicle driver, the knob being guided from its position illustrated in Fig. 2 to a position in spaced relationship from dash 69, in which extended position the guide portion 71 of the handle registers a notch 72 thereof with spring pressed ball 73 carried by guide block 74. The ball 73 and the notch cooperate to advise the operator of the proper positioning of handle 70 for effecting the desired swinging of lever 63 and its pivot pin 61. This swinging movement of the lever will, when notch 72 is engaged by ball 73, move rod 54 against spring 57 and also shift the clutch 32 independently of movement of the reverse shifter 16 to manually lock out the free wheel clutch D by engaging teeth 34 and 31. During such movement the ear 60$^c$ swings lever 60 to move arm 51, a gap being brought about between lever portion 60$^a$ and the rear end of rod 64.

Referring now to the details of clutch C which is preferably of the automatic type, one form of which is shown in Figs. 5 and 6, the planet carrier 41 is provided with diametrically arranged pairs of lateral extensions or pawl guides 75 and 76, these extensions having arcuate faces 77 fitting within shell 46. Extensions 75 have pawl engaging faces 78 and extensions 76 have similar bearing faces 79. Fitting within shell 46 are a pair of the said pawls 44, each having a face in sliding engagement with a face 77 of extension 75 and each extending generally inwardly of the pawl carrying cage. Thus, each pawl is formed with a yoke portion 80 normally seated at 81 on an extension 76, each yoke portion having guide 82 slidable intermediate a face 79 and the side of the other pawl opposite the side thereof in engagement with the face 78.

In order to normally urge the pawls inwardly of the pawl cage to position the parts as shown in Fig. 5, springs 83 are provided, each spring acting on the head 84 of the screw bolt 85 threadedly engaging openings 86 in extension 76 and yoke portions 80 are respectively provided with an opening 87 aligned with opening 86, each spring 83 acting on a seat 88 of the associated yoke portion 80. If desired, each pawl 44 may be provided with a spring actuated ball detent 89 releasably engaging a recess 90 of the pawl guide portion 82 of the other pawl to assist in holding the pawls in stabilized condition and to prevent hunting prior to their release for outward clutching movement.

The shell 46 has the aforesaid plurality of circumferentially spaced pawl receiving slots or openings 45 suitably spaced so that diametrically arranged pairs of slots will simultaneously register with the pawls 44 so as to receive said pawls under conditions hereinafter more apparent.

The threaded ends of screw bolts 85 are each slotted at 91 to receive the detent spring 92. It will be apparent that the pawl springs 83 may be readily reached and adjusted from without shell 46 by aligning each of the bolt heads 84 with one of the slots 45. Slot 45 is also aligned with one of the openings 93 of sleeve 43 and with an opening 94 of the casing when plug 95 thereof is removed. Thus, I have provided for the spring adjustment from without the casing of the driving mechanism A. The screw bolts 85 may thus be rotated to further compress or relieve the springs 83 to effect the desired setting governing the action of the pawls, the detents 92 releasably engaging slots 91. Furthermore, by aligning any bolt 85 with one of the shell openings 45 and with openings 93 and 94, the bolt and spring 83 may be readily removed and replaced without tearing down the clutch parts or other parts of the mechanism.

The other ends of pawls 44 are preferably provided with cam faces 96 acting on the inner edges of slots 45 to progressively release the pawls outwardly when the clutch shell and cage are rotating substantially together at a predetermined speed. When pawls 44 move outwardly in slots 45, such movement is limited by engagement of yoke portions 80 with projections 75, the yoke portions sliding on bolts 85.

In Figs. 1, 7 and 8 I have illustrated a double planetary system of overdrive gearing in order to provide the generally desired relatively low overdrive gear ratio and at the same time avoiding the necessity for using gears of relatively large diameter.

With the parts positioned as shown in Fig. 1, the planet gears 38 are rotated in the direction of rotation of shaft 21 but at a slower speed, the sun gear 39 of the second planetary gear set rotating planet carrier 41 thereof and hence pawls 44 at a further reduction. Internal gear 42 is rotated at all times with the driven shaft 10 and since sun gear 39 is driven at a speed less than that of driving shaft 21 and in the same direction, the effective gear ratio reduction in driving the pawls from driven shaft 10 is less than would be the case where the first planetary set were omitted and sun gear 39 were driven directly from shaft 21, such position being illustrated in Fig. 9 referred to hereinafter. In order to reduce the amount of overdrive, the first planetary gear set is thus preferably provided. Other arrangements of gear ratios may also be provided if desired in any particular instance.

In operation of the power transmitting mechanism with the parts positioned as in Fig. 1, the engine will drive shaft 21 and hence the driven shaft 10 to drive the vehicle forwardly in direct drive so far as the driving and driven shafts 21 and 10 respectively are concerned. This direct drive takes place from shaft 21, through the free wheel clutch D and thence to driven shaft 10. When the vehicle tends to overrun the engine such action may take place by reason of clutch D. During this direct drive the shell 46 will be driven by splines 23 of shaft 21 at the speed of shaft 21 while the pawls will be rotated by planet carrier 41 at a speed less than that of the driven shaft 10 and driving shaft 21 by reason of the reduction through the aforesaid planetary gearing.

By way of illustrating one manner of operation of my automatic clutch C, this clutch is illustrated as being adapted to automatically lock out or to render the free wheel clutch D ineffective and to simultaneously drive shaft 10 from shaft 21 at a predetermined speed of rotation of shaft 10 and hence a predetermined speed of vehicle travel. When such clutching action takes place, the shaft 10 is driven from shaft 21 as aforesaid by reason of the planetary gearing. This drive provides an overdrive or a higher speed of the driven shaft 10 than that of the driving shaft 21. An overdrive is ordinarily desirable at only relatively high speeds of vehicle travel and hence, by a suitable selection and setting of the pawl springs 83, assisted somewhat by the detents 89, these pawls may be held inoperative against the influence of centrifugal forces acting to move the pawls outwardly until the desired predetermined critical speed has been reached. Assuming, by way of example, that such automatic overdrive is desired at approximately 50 miles per hour of vehicle travel, then, when the vehicle is being driven at this speed, the pawls are urged outwardly by centrifugal force to engage slots 45 of the shell 46 when rotation of the pawl cage and shell become substantially uniform. Under the assumed conditions, springs 83 may be set so that the pawls tend to fly outwardly at a speed of shaft 10 corresponding to fifty miles per hours of vehicle travel, the pawls being restrained from moving outwardly, until the clutch parts are synchronized, by reason of the gear reduction which drives the pawls at a slower speed than that of slots 45 which are driven directly from the drive shaft 21.

Owing to the difference in rotational speeds of the slots and pawls, the parts pass each other with such rapidity that the pawls do not have time to move outwardly to engage the slots and the parts continue to slip until the operator momentarily releases or diminishes the power of the engine applied to shaft 21 so as to permit the shell 46 to decelerate by reason of the overrunning clutch D, the shifting clutch 32 being in the position shown in Fig. 1. In decelerating, the shell 46 obviously very quickly drops to the speed of the pawl cage, momentarily synchronizing the pawls with a pair of diametrically arranged slots 45, the pawls thereupon being guided out during rotation thereof by cam faces 96 for effecting initial engagement of the pawls in the slots. Once engaged, the centrifugal force acting on the pawls carries them outwardly for fully engaging the slots of shell 46 as shown in Fig. 6 and the overdrive immediately takes place with the free wheel clutch D locked out as aforesaid.

As long as the engine drives the vehicle at or above the aforesaid overdrive speed, with the pawls 44 engaged in slots 45, the clutch C will remain engaged. However, when the vehicle slows down below the aforesaid fifty miles per hour, in the assumed illustration, the pawls 44 will be urged to their retracted or normal position of Fig. 5, such retraction taking place just as soon as the friction of the drive is relieved or reversed between the sides of the slots and pawls. Thus when the vehicle driver momentarily releases the usual accelerator pedal to cause the vehicle to drive the engine this reversal of drive permits retraction of the pawls and the power transmission is then again operating without the overdrive and through the free wheeling clutch D.

When it is desired to drive the vehicle in reverse, shifter 16 is moved to shift gear 13 into engagement with the reverse idler gear 17. This causes rearward movement of arm 51 to move clutch 32 forwardly, as viewed in Fig. 1, so as to engage teeth 31 and 34 to lock out the free wheel clutch B. This reverse drive thus passes from shaft 21 to cam member 24, clutch 32 and thence to the driven shaft 10, it being understood that shaft 10 has its rotation reversed by the reversing mechanism of the transmission B. The clutch 32 may also be actuated to lock out the overrunning clutch D when the automatic clutch C is not in its clutching action, by shifting arm 51 through ear 60c and lever 60 independently of movement of selector rod 16 by reason of the handle 70. When this handle is pulled to engage notch 72 with ball 73 the overrunning clutch is locked out.

I desire to point out that instead of driving the slot carrying shell 46 directly from the drive shaft 21 and hence from the engine, and the pawl cage from the driven shaft 10, such parts may be readily reversed, as illustrated in Figs. 9 and 10 referred to hereinafter, so as to drive the pawl cage directly from the engine and the slots from the vehicle driven shaft 10. The illustrated arrangement of Fig. 1 is preferred, however, where an automatic clutch is used in an overdrive mechanism, since the engine continues to drive at the overdrive speed from the time when the pawls are engaged in the pawl slots viz. at a speed slower than in direct drive for the same vehicle speed. With the suggested reversal of clutch parts according to Figs. 9 and 10, the engine would have to operate considerably faster by the overdrive ratio, than the driven shaft to speed up the slot carrying member and then by slowing down the engine momentarily to reduce the speed of the pawl cage to that of the slot carrying member, the pawls will engage the slots. In such instance, it is therefore apparent that the engine would have to drive at a speed greater than its speed for the overdrive setting of the pawls in order to establish the proper conditions for effecting actuation of the automatic clutch C.

While I have illustrated my invention in connection with an overdrive mechanism for motor vehicles, I desire to point out that this is but one useful application or use of my driving mechanism which may be used to advantage wherever a clutching action between two rotatable parts is desired, particularly where such action is to be automatically responsive to desired conditions of relative rotatable speeds of the two members to be clutched or declutched.

While I do not limit my invention in its broader aspects, to a clutch C of the automatic type or to any particular relationship of spring forces and centrifugal forces acting on the pawls of an automatic type of clutch, I prefer to incorporate an automatic clutch as a part of my invention and to provide the pawls thereof in substantially balanced or floating condition at the speed of rotation of the pawl cage where clutching action is desired. Thus, I prefer to arrange the spring rates so that at the critical speed of clutch engagement, the centrifugal force acting on any pawl will be substantially counterbalanced by the pull of the pawl spring so that the pawl can readily move outwardly into clutching position. At the end of the outward displacement of the center of gravity of any such pawl, the pawl is preferably also substantially counterbalanced by the inward pull of the spring associated therewith. Centrifugal force is proportional to the distance of the center of gravity of a rotating mass from its axis, and the increase of this force due to the increase of the center of gravity distance is counterbalanced by an increase of the spring load occasioned by the pawl movement. The spring rate is thus preferably one which balances the increase in centrifugal force during outward pawl movement.

Referring now to the modified forms of my invention illustrated in Figs. 9 and 10, the general arrangement and operation of the driving mechanisms illustrated therein are similar to that of the embodiment of Figs. 1 to 8 and much of the details have been omitted to avoid duplication. In Figs. 9 and 10, I have used reference characters similar to corresponding parts of Figs. 1 to 8 and the letter primed reference characters indicate parts generally similar in construction and function with the unprimed characters of Figs. 1 to 8.

Thus, in Fig. 9, the driving mechanism A' may be substituted for mechanism A of Fig. 1, driving shaft 21a piloting the forward end 96 of driven shaft 10a, it being understood that shaft 21a may receive the drive from the transmission, and shaft 10a corresponds in like function with that described in connection with shaft 10 of Fig. 1. In Fig. 9 the shiftable clutch 32 has teeth 31 engageable with teeth 30a of the cylindrical driven member 27a of the overrunning clutch D', the latter having cylinders 26 and driving inner cam member 24a. In this instance, this cam member as before has teeth 34a and driven from shaft 21a by splines 23a thereof, teeth 34a being engageable with teeth 31 of shiftable clutch 32 when the latter is moved forwardly by arm 51 as aforesaid to lock out the overrunning clutch.

Cam member 24a, in Fig. 9, carries the pawl cage and therefore is adapted to drive the pawls 44a of the automatic clutch C', the slots 45a of shell 46a being driven by the planet carrier 41a having planet gears 40a meshing with a sun gear 39a in this case fixed by bracket 97 to the casing of transmission B'. Planet gears 40a also mesh with annular internal gear 42a of the sleeve 43a, this sleeve and cylindrical member 27a being drivingly connected by engaging teeth 98.

In Fig. 9, the single planetary gear set is thus adapted to at all times rotate slots 45a from the driven shaft 10a at a speed less than that of the pawls 44 which are directly driven from the shaft 21ª. With clutch 32 positioned as in Fig. 9, shaft 21ª drives shaft 10ª through the overrunning clutch D' until, at the critical speed, pawls 44ª are engaged with slots 45ª in the manner heretofore described, whereupon the overrunning clutch is ineffective and continues to be so until the pawls are retracted below the critical speed.

Clutch 32, as before, is adapted to lock out the overrunning clutch D' by a forward shifting movement to engage teeth 34ª with teeth 31, the clutch 32 being shifted manually in response to actuation of the transmission reverse mechanism or by the dash control when the automatic clutch C' is disengaged.

In Fig. 10, I have illustrated double planetary sets of gearing as in Fig. 1 but the pawls are driven from the driving shaft and the slots from the driven shaft as in Fig. 9. In addition, therefore, to the same parts as in Fig. 9 and as noted by the same reference characters, the planet gears 40ª of Fig. 10 are given an initial movement less than the speed of shaft 21ᵇ by the same sun gear 39 and parts of the forward planetary gear set as in the Fig. 1 embodiment and as illustrated by the same reference numerals as applied to these duplicated parts of Fig. 10, splines 23ᵇ corresponding to splines 23 of Fig. 1.

The operation of the mechanism of Fig. 10 is the same as referred to in connection with Fig. 9, except that slots 45ª will be driven somewhat more slowly by reason of the additional reduction afforded by the forward planetary gear set as will be readily understood from the detailed description of the operation of the corresponding planetary gear set of Fig. 1.

I do not limit my invention, in the broader aspects thereof, to the particular combination and arrangement of parts shown and described for illustrative purposes since various modifications will be apparent within the teachings of my invention as defined in the appended claims.

What I claim is:

1. In a drive for a motor vehicle having a power driving shaft and a shaft driven therefrom and adapted to drive said vehicle, overdriving means including planetary gearing between said shafts for driving said driven shaft at a speed greater than the speed of the driving shaft, and a speed responsive clutch controlling said overdriving means, said clutch including clutching structures respectively adapted for driving connection to said driving and driven shafts at least when said structures are clutched, said clutch being adapted to automatically connect said shafts through said planetary gearing.

2. In a drive for a motor vehicle having a power driving shaft and a shaft driven therefrom and adapted to drive said vehicle, overdriving means including planetary gearing between said shafts for driving said driven shaft at a speed greater than the speed of the driving shaft, and a clutch including clutching structures respectively drivingly connected to said driving and driven shafts for controlling said planetary gearing, said clutch being adapted to automatically connect said shafts through said overdriving means in response to a predetermined speed of rotation of at least one of said shafts.

3. In a drive for a motor vehicle having a power driving shaft and a shaft driven therefrom and adapted to drive said vehicle, overdriving means including a plurality of planetary gear sets between said shafts for driving said driven shaft at a speed greater than the speed of the driving shaft, and a clutch including clutching structures respectively drivingly connected to said driving and driven shafts for controlling said overdriving means, said clutch being adapted to automatically connect said shafts through said overdriving means.

4. In a vehicle drive, power driving means, means driven by said power driving means and adapted to drive the vehicle, overdriving means including planetary gearing intermediate said driving and driven means for driving said driven means at a speed greater than that of said driving means, and a clutch automatically connecting said driving means and driven means through said intermediate driving means in response to a predetermined speed of rotation of at least one of the first two said means.

5. In a vehicle drive, power driving means, means driven by said power driving means and adapted to drive the vehicle, overdriving means including planetary gearing intermediate said driving and driven means for driving said driven means at a speed greater than that of said driving means, and a clutch including clutching parts adapted for positive clutching engagement for automatically connecting said driving means and driven means through said intermediate driving means.

6. In a power transmission for a motor vehicle having a power driving shaft and a shaft driven therefrom and adapted to drive the vehicle, means including an overrunning clutch intermediate said shafts for driving said driven shaft from said driving shaft and for releasing said drive when said driven shaft overruns said driving shaft, overdriving means including planetary gearing between said shafts for driving said driven shaft at a speed greater than the speed of the driving shaft, and a clutch including clutching structures respectively drivingly connected to said driving and driven shafts for controlling said overdriving means, said clutch being adapted to automatically connect said shafts through said overdriving means.

7. In a power transmission for a motor vehicle having a power driving shaft and a shaft driven therefrom and adapted to drive the vehicle, means including an overrunning clutch intermediate said shafts for driving said driven shaft from said driving shaft and for releasing said drive when said driven shaft overruns said driving shaft, overdriving means including planetary gearing between said shafts for driving said driven shaft at a speed greater than the speed of the driving shaft, and a clutch controlling said overdriving means, said clutch being adapted to automatically connect said shafts through said overdriving means and the planetary gearing thereof in response to a predetermined speed of rotation of at least one of said shafts.

8. In a power transmission for a motor vehicle having a power driving shaft and a shaft driven therefrom and adapted to drive the vehicle, means including an overrunning clutch intermediate said shafts for driving said driven shaft from said driving shaft and for releasing said drive when said driven shaft overruns said driving shaft, overdriving means including planetary gearing between said shafts for driving said driven shaft at a speed greater than the speed of the driving shaft, and a clutch controlling said overdriving means, said clutch being adapted to automatically connect said shafts through said overdriving means and through the planetary gearing thereof, said overdriving means being adapted to render said overrunning clutch inoperative in response to clutching action of said automatically connecting clutch.

9. In a power transmission for a motor vehicle having a power driving shaft and a shaft driven therefrom and adapted to drive the vehicle, means including an overrunning clutch intermediate said shafts for driving said driven shaft from said driving shaft and for releasing said drive when said driven shaft overruns said driving shaft, overdriving means including planetary gearing between said shafts for driving said driven shaft at a speed greater than the speed of the driving shaft, and a clutch controlling said overdriving means, said clutch being adapted to automatically connect said shafts through said overdriving means, and manually controlled means for rendering said overrunning clutch inoperative.

10. In a vehicle drive, power driving means, means driven by said power driving means and adapted to drive the vehicle, planetary gearing means intermediate said driving and driven means for driving said driven means at a speed different from that of said driving means, and a clutch automatically connecting said driving means and driven means through said intermediate planetary gearing driving means, and manually controlled means adapted to directly drivingly couple said driving and driven means for rendering said clutch in inoperative condition.

11. In a power transmission for a motor vehicle having a power driving shaft and a shaft driven therefrom and adapted to drive the vehicle, means including an overrunning clutch intermediate said shafts for driving said driven shaft from said driving shaft and for releasing said drive when said driven shaft overruns said driving shaft, overdriving planetary gearing means between said shafts for driving said driven shaft at a speed greater than the speed of the driving shaft, and a clutch controlling said over-driving means, said clutch being adapted to automatically connect said shafts through said overdriving means, and manually controlled means rendering said overrunning clutch and said automatically connecting clutch simultaneously inoperative.

12. In a vehicle drive, power driving means, means driven by said power driving means and adapted to drive the vehicle, means including an overrunning clutch for driving said driven means from said driving means and for releasing the drive when said driven means overruns said driving means, auxiliary planetary gearing means intermediate said driving means and driven means for driving said driven means at a speed different from that of said driving means, a second clutch adapted to control the drive between said driving means and said auxiliary planetary gearing driving means, a third clutch driven by said driven means and transmitting the drive from said overrunning clutch to said driven means, and means for shifting said third clutch to drivingly connect said driving means with said driven means independently of said auxiliary planetary gearing means.

13. In a vehicle drive, power driving means, means driven by said power driving means and adapted to drive the vehicle, means including an overrunning clutch for driving said driven means from said driving means and for releasing the drive when said driven means overruns said driving means, auxiliary planetary gearing means intermediate said driving means and driven means for driving said driven means at a speed different from that of said driving means, a second clutch adapted to control the drive between said driving means and said auxiliary driving means, manually controlled means for reversing the direction of drive between said driving and driven means, and means responsive to actuation of said manually controlled means for rendering said overrunning clutch inoperative, said second clutch being adapted to automatically establish said drive between said driving means and said auxiliary planetary gearing driving means.

14. In a vehicle drive, power driving means, means driven by said power driving means and adapted to drive the vehicle, planetary gearing means intermediate said driving and driven means for driving said driven means at a speed different from that of said driving means, said intermediate planetary gearing driving means including a centrifugal force actuated element adapted to be driven by said driving means and a member adapted to drivingly receive said element and being further adapted for driving connection with said driven means, said element and member controlling said intermediate planetary gearing driving means, said element and member being so constructed and arranged as to provide positive interlocking coupling thereof under the influence of centrifugal force actuation of said element.

15. In a vehicle drive, power driving means, means driven by said power driving means and adapted to drive the vehicle, planetary gearing means intermediate said driving and driven means for driving said driven means at a speed different from that of said driving means, said intermediate planetary gearing driving means including a centrifugal force actuated element adapted to be driven by said driven means and a member adapted to drivingly receive said element and being further adapted for driving connection with said driving means, said element and member controlling said intermediate planetary gearing driving means, said element and member being so constructed and arranged as to provide positive interlocking coupling thereof under the influence of centrifugal force actuation of said element.

16. In a vehicle drive, power driving means, means driven by said power driving means and adapted to drive the vehicle, planetary gearing overdriving means intermediate said driving and driven means for driving said driven means at a speed greater than that of said driving means, said intermediate planetary gearing driving means including cooperating clutching members one of which is actuated by centrifugal force for engagement with the other, one of said members being driven from said driving means and the other being driven from said driven means, said clutching members being so constructed and arranged as to provide positive interlocking coupling thereof under the influence of centrifugal force actuation of the first said clutching member.

17. In a device of the character described, a driving shaft, a driven shaft aligned with the driving shaft and extending rearwardly therefrom, said driven shaft having splines adjacent the end of the driving shaft, a shiftable clutch engaging said splines and having clutch teeth, an overrunning clutch including a cam member carried by said driving shaft and having teeth engageable with the teeth of said shiftable clutch, said overrunning clutch including a driven member having teeth at all times engaging the teeth of said shiftable clutch, an automatic clutch having cooperating members adapted for automatic clutching engagement in response to synchronized rotational speeds thereof, one of said cooperating clutch members being driven at all times from said driving shaft, a planet carrier adapted to drive the other of said cooperating clutch members when said automatic clutch is disengaged, a sleeve having an internal gear concentric with said driving shaft and adapted to be driven from said driven member of said overrunning clutch when said automatic clutch is disengaged, planetary reduction gearing means transmitting the drive from said internal gear to said planet carrier when said automatic clutch is disengaged, and means for shifting said shiftable clutch to engage the teeth thereof with the said teeth of the driven member of the overrunning clutch to directly drivingly connect the driving and driven shafts when said automatic clutch is disengaged, said automatic clutch and said overrunning clutch being thereby rendered inoperative.

18. In a power transmission for a motor vehicle, power driving means including a driving shaft, means including a shaft driven from said driving means and adapted to drive the vehicle, said driving and driven shafts being co-axially arranged for relative rotation, an internal gear rotatable with said driven shaft, a sun gear, a planetary pinion engaging said internal gear and said sun gear, clutching structures adapted when declutched to be driven by said planetary pinion and by said driving means respectively, said clutching structures being adapted when clutched to provide a drive from said driving means to said driven means, and an overrunning clutch including driving and driven portions thereof respectively drivingly associated with said driving means and said driven means whereby to transmit a one-way drive therebetween, said driven means overrunning said driving means when said driven means is driven from said driving means through said clutching structures, the clutching structure which is adapted to be driven by said driving means as aforesaid including a centrifugal force actuated element adapted for positive clutching engagement with the other of said structures.

19. In a power transmission for a motor vehicle, power driving means including a driving shaft, means including a shaft driven from said driving means and adapted to drive the vehicle, said driving and driven shafts being co-axially arranged for relative rotation, an internal gear rotatable with said driven shaft, a sun gear, a planetary pinion engaging said internal gear and said sun gear, a carrier for said planetary pinion, clutching structures adapted when declutched to be driven by said planetary pinion carrier and by said driving means respectively, said clutching structures being adapted when clutched to provide a drive from said driving means to said driven means, an overrunning clutch including driving and driven portions thereof respectively drivingly associated with said driving means and said driven means whereby to transmit a one-way drive therebetween, said driven means overrunning said driving means when said driven means is driven from said driving means through said clutching structures, and a manually shiftable clutch sleeve splined to said driven shaft and to said overrunning clutch driven portion, said overrunning clutch driving portion having a clutching portion thereof adapted for clutching engagement with said clutch sleeve to provide a two-way drive between said driving and driven means.

20. In a power transmission for a motor vehicle, power driving means including a driving shaft, means including a shaft driven from said driving means and adapted to drive the vehicle, said driving and driven shafts being co-axially arranged for relative rotation, an internal gear rotatable with said driven shaft, a relatively fixed internal gear, a sun gear driven by said driving means, a planetary gear engaging said fixed internal gear and said sun gear, a second sun gear driven from said planetary gear, a planetary pinion engaging said rotatable internal gear and said second sun gear, a carrier for the last said planetary pinion, clutching structures adapted when declutched to be driven by said planetary pinion carrier and by said driving means respectively, said clutching structures being adapted when clutched to provide a drive from said driving means to said driven means, and an overrunning clutch including driving and driven portions thereof respectively drivingly associated with said driving means and said driven means whereby to transmit a one-way drive therebetween, said driven means overrunning said driving means when said driven means is driven from said driving means through said clutching structures.

21. In a power transmission for a motor vehicle, power driving means including a driving shaft, means including a shaft driven from said driving means and adapted to drive the vehicle, said driving and driven shafts being co-axially arranged for relative rotation, an internal gear rotatable with said driven shaft, a multiple reduction planetary gearing means including a relatively stationary gear and a planetary pinion engaging said internal gear, a carrier for said planetary pinion, clutching structures adapted when declutched to be driven by said planetary pinion carrier and by said driving means respectively, said clutching structures being adapted when clutched to provide a drive from said driving means to said driven means, and an overrunning clutch including driving and driven portions thereof respectively drivingly associated with said driving means and said driven means whereby to transmit a one-way drive therebetween, said driven means overrunning said driving means when said driven means is driven from said driving means through said clutching structures.

22. In a power transmission for a motor vehicle having a power driving shaft and a shaft driven therefrom and adapted to drive the vehicle, said driving and driven shafts being co-axially arranged for relative rotation, an overrunning clutch including inner and outer clutch members one of which is drivingly connected to said driving shaft and the other of which is drivingly connected to said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, and means for drivingly connecting said clutching structures one to said driving shaft and the other to said driven shaft whereby said clutching structures are driven at relatively different speeds when the driving shaft drives the driven shaft through said overrunning clutch, said driving connecting means for one of said clutching structures including planetary gearing having a part thereof drivingly connected to that clutching structure.

23. In a power transmission for a motor vehicle having a power driving shaft and a shaft driven therefrom and adapted to drive the vehicle, said driving and driven shafts being co-axially arranged for relative rotation, an overrunning clutch including inner and outer clutch members one of which is drivingly connected to said driving shaft and the other of which is drivingly connected to said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, and means for drivingly connecting said clutching structures one to said driving shaft and the other to said driven shaft whereby the clutching structure which is drivingly connected to said driven shaft is rotated at a speed less than that of the other of said clutching structures when the driving shaft drives the driven shaft through said overrunning clutch, said driving connecting means for one of said clutching structures including planetary gearing having a planetary pinion carrier drivingly connected to that clutching structure.

24. In a power transmission for a motor vehicle having a power driving shaft and a shaft driven therefrom and adapted to drive the vehicle, said driving and driven shafts being co-axially arranged for relative rotation, an overrunning clutch including inner and outer clutch members one of which is drivingly connected to said driving shaft and the other of which is drivingly connected to said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, and means for drivingly connecting said clutching structures one to said driving shaft and the other to said driven shaft whereby the clutching structure which is drivingly connected to said driven shaft is rotated at a speed less than that of the other of said clutching structures when the driving shaft drives the driven shaft through said overrunning clutch, said driving connecting means for one of said clutching structures including planetary gearing having a part thereof drivingly connected to that clutching structure, said overrunning clutch releasing the drive therethrough for reducing the speed of the driving shaft to substantially synchronize the rotational speeds of said clutching structures.

25. In a power transmission for a motor vehicle having a power driving shaft and a shaft driven therefrom and adapted to drive the vehicle, said driving and driven shafts being co-axially arranged for relative rotation, an overrunning clutch including inner and outer clutch members one of which is drivingly connected to said driving shaft and the other of which is drivingly connected to said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, means for drivingly connecting said second clutching structure to said driving shaft, means including multiple reduction planetary gearing for drivingly connecting said cylindrical clutching structure to said driven shaft whereby said cylindrical clutching structure is rotated at a speed less than that of said second clutching structure when the driving shaft drives the driven shaft through said overrunning clutch.

26. In a vehicle drive, a speed ratio changing transmission having a power take-off driving shaft, an overdriving mechanism associated with said transmission and having a shaft aligned with said driving shaft and adapted to be driven therefrom for driving the vehicle, an overrunning clutch intermediate said driving and driven shafts adapted to transmit a direct drive therebetween, speed responsive clutch means including driving and driven clutching structures adapted for clutching action in response to substantially synchronized rotation thereof at or above a predetermined speed, one of said clutching structures comprising a centrifugal force actuated pawl, means for driving the last said structure from said driving shaft, and means for driving the other of said structures from said driven shaft, the last said driving means including planetary gearing having a sun gear through which said driving shaft extends, said driving means being adapted to drive said structures at relatively different speeds when said driving shaft drives said driven shaft through said overrunning clutch, said clutching structures being adapted to establish a positive drive from said driving shaft to said driven shaft through said driving means in response to overrun of the driving shaft by said driven shaft.

27. In a power driving mechanism having a driving shaft and a shaft driven therefrom, an overrunning clutch intermediate said driving and driven shafts adapted to transmit a direct drive therebetween, speed responsive clutch means including driving and driven clutching structures adapted for clutching action in response to substantially synchronized rotation thereof at or above a predetermined speed, one of said clutching structures comprising a centrifugal force actuated pawl, means for driving the last said structure from said driving shaft, and means for driving the other of said structures from said driven shaft, the last said driving means including planetary gearing having a sun gear through which said driving shaft extends, said driving means being adapted to drive said structure at relatively different speeds when said driving shaft drives said driven shaft through said overrunning clutch, said clutching structures being adapted to establish a positive drive from said driving shaft to said driven shaft through said driving means in response to overrun of the driving shaft by said driven shaft.

28. In a drive for a motor vehicle having a power driving shaft and a shaft driven therefrom and adapted to drive the vehicle, said driving and driven shafts being in axial alignment, overrunning clutch means intermediate said shafts for transmitting a releasable one-way direct drive therebetween, rotatable clutching structures one having a clutching element adapted to clutch with the other in response to substantially synchronized rotation of said clutching structures at or above a predetermined speed to provide a releasable positive driving connection therebetween, means for driving one of said structures from said driving shaft, means for driving the other of said structures from said driven shaft, at least one of said driving means including planetary gearing adapted to drive its associated clutching structure at a speed different from that imparted to the other of said structures when said driving shaft drives said driven shaft through said overrunning clutch, said planetary gearing including a sun gear through which one of said shafts projects.

29. In a drive for a motor vehicle having a power driving shaft and a shaft driven therefrom and adapted to drive the vehicle, said driving and driven shafts being in axial alignment, overrunning clutch means intermediate said shafts for transmitting a releasable one-way direct drive therebetween, rotatable clutching structures one having a centrifugal force actuated clutching element adapted to positively clutchingly engage the other in response to substantially synchronized rotation of said clutching structures at or above a predetermined speed to provide a releasable positive driving connection therebetween, means for driving one of said structures from said driving shaft, means for driving the other of said structures from said driven shaft, at least one of said driving means including planetary gearing adapted to drive its associated clutching structures at a speed different from that imparted to the other of said structures when said driving shaft drives said driven shaft through said overrunning clutch, said planetary gearing including a pair of sun gears through which one of said shafts extends, one of said sun gears being directly driven by the last said shaft and the other having rotation relatively thereto.

30. In a drive for a motor vehicle having a power driving shaft and a shaft driven therefrom and adapted to drive the vehicle, said driving and driven shafts being in axial alignment, overrunning clutch means intermediate said shafts for transmitting a releasable one-way direct drive therebetween, rotatable clutching structures one having a clutching element and the other having a slot adapted to receive said element in response to substantially synchronized rotation of said clutching structures at or above a predetermined speed to provide a releasable positive driving connection therebetween, means for driving one of said structures from said driving shaft for rotation at the same speed therewith, and means including a planetary gear train for driving the other of said structures from said driven shaft whereby said structures rotate at different speeds when said driven shaft is driven through said overrunning clutch, said planetary gear train including a planetary gear carrier connected to one of said clutching structures.

31. In a power transmission for a motor vehicle having a power driving shaft and a shaft driven therefrom and adapted to drive the vehicle, said driving and driven shafts being concentrically arranged for relative rotation, an overrunning clutch including inner and outer clutch members one of which is drivingly connected to said driving shaft and the other of which is drivingly connected to said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, means for drivingly connecting said clutching structures one to said driving shaft and the other to said driven shaft whereby said clutching structures are driven at relatively different speeds when the driving shaft drives the driven shaft through said overrunning clutch, one of said driving connecting means including planetary gearing having an internal gear driven by said driven shaft, manually controlled means for reversing the normal direction of drive of said driving shaft, and clutching means including a sleeve shiftable axially of one of said shafts and actuated by said manually controlled means for positively drivingly connecting said driving and driven shafts whereby to render said overrunning clutch inoperative.

32. In a drive for a motor vehicle, a driving shaft, a driven shaft, an overrunning clutch including driving and driven portions thereof respectively drivingly connected to said driving and driven shafts for providing a one-way drive therebetween, overdriving means for said driven shaft including clutching structures one adapted to be driven from said driving shaft and the other adapted to be driven from said driven shaft, the said overdriving means also including reduction gearing between said driven shaft and one of said clutching structures for driving the last said clutching structure slower than the other when said clutching structures are disengaged, a manually shiftable clutch sleeve having a series of internal teeth slidably engaging one of said shafts and a series of external teeth adapted at all times to provide a drive relatively between one of said clutching structures and the last said shaft, a set of clutch teeth at all times drivingly connected to the other of said shafts and adapted for clutching engagement with one of said series of teeth for locking out said overrunning clutch to provide a two-way drive between said driving and driven shafts, and means for manually shifting said clutch sleeve.

33. In a drive for a motor vehicle, a driving shaft, a driven shaft, an overrunning clutch including driving and driven portions thereof respectively drivingly connected to said driving and driven shafts for providing a one-way drive therebetween, overdriving means for said driven shaft including clutching structures one adapted to be driven from said driving shaft and the other adapted to be driven from said driven shaft, the said overdriving means also including reduction gearing between said driven shaft and one of said clutching structures for driving the last said clutching structure slower than the other where said clutching structures are disengaged, a manually shiftable clutch sleeve having a series of internal teeth slidably engaging one of said shafts and a series of external teeth adapted at all times to provide a drive relatively between one of said clutching structures and the last said shaft, a set of clutch teeth at all times drivingly connected to the other of said shafts and adapted for clutching engagement with one of said series of teeth for locking out said overrunning clutch to provide a two-way drive between said driving and driven shafts, and means for manually shifting said clutch sleeve, said clutching structures being adapted for automatic clutching engagement in response to substantially synchronized speed thereof only when said shiftable clutch sleeve is positioned for disengagement with said set of clutch teeth.

34. In a drive for a motor vehicle, a driving shaft, a driven shaft, an overrunning clutch including driving and driven portions thereof respectively drivingly connected to said driving and driven shafts for providing a one-way drive therebetween, overdriving means for said driven shaft including clutching structures one adapted to be driven from said driving shaft and the other adapted to be driven from said driven shaft, the said overdriving means also including reduction gearing between said driven shaft and one of said clutching structures for driving the last said clutching structure slower than the other when said clutching structures are disengaged, a manually shiftable clutch sleeve having a series of internal teeth slidably engaging one of said shafts and a series of external teeth adapted at all times to provide a drive relatively between one of said clutching structures and the last said shaft, a set of clutch teeth at all times drivingly connected to the other of said shafts and adapted for clutching engagement with said series of external clutch teeth for locking out said overrunning clutch to provide a two-way drive between said driving and driven shafts, and means for manually shifting said clutch sleeve.

35. In a drive for a motor vehicle, a driving shaft, a driven shaft, an overrunning clutch including driving an driven portions thereof respectively drivingly connected to said driving and driven shafts for providing a one-way drive therebetween, overdriving means for said driven shaft including clutching structures one adapted to be driven from said driving shaft and the other adapted to be driven from said driven shaft, the said overdriving means also including reduction gearing between said driven shaft and one of said clutching structures for driving the last said clutching structure slower than the other when said clutching structures are disengaged, a manually shiftable clutch sleeve having a series of internal teeth slidably engaging one of said shafts and a series of external teeth adapted at all times to provide a drive relatively between one of said clutching structures and the last said shaft, a set of clutch teeth at all times drivingly connected to the other of said shafts and adapted for clutching engagement with one of said series of teeth for locking out said overrunning clutch to provide a two-way drive between said driving and driven shafts, means for manualy shifting said clutch sleeve, manually controlled means for reversing the normal direction of drive of said driving shaft, and means responsive to operation of said manually controlled reversing means for shifting said clutch sleeve into its lock out position independently of said manually shifting means.

36. In a motor vehicle drive, aligned driving and driven shafts, means including planetary gearing intermediate said driving and driven shafts for driving said driven shaft at a speed greater than that of said driving shaft, said intermediate driving means including cooperating clutching members one of which is actuated by centrifugal force for engagement with the other when the speeds of said clutching members are substantially synchonized, one of said clutching members prior to clutching engagement with the other being drivingly connected with one of said shafts for rotation at the same speed therewith and the other being drivingly connected through said planetary gearing with the other of said shafts for rotation at a speed differing therefrom, and releasable means for driving said driven shaft from said driving shaft at the same speed therewith prior to engagement of said clutching members, said releasable driving means being adapted to release said drive for permitting engagement of said clutching members when the speeds thereof are substantially synchronized as aforesaid.

37. In a power transmission for a motor vehicle, power driving means including a driving shaft, means including a shaft driven from said driving means and adapted to drive the vehicle, said driving and driven shafts being coaxially arranged for relative rotation, planetary gearing adapted to drive the driven shaft from said driving shaft at a speed greater than that of the driving shaft, said planetary gearing including a sun gear, an internal gear and a planet gear intermediate said sun and internal gears, means drivingly connected to said driving and driven shafts and including rotatable clutching structures adapted when clutched to drivingly connect said shafts through said planetary gearing, means for releasably driving said driven shaft from said driving shaft at the same speed therewith prior to engagement of said clutching structures, one of said clutching structures comprising a centrifugal force actuated element driven from said driving shaft at the same speed therewith and the other of said clutching structures being driven through said planetary gearing at a relatively different speed prior to clutch engagement, said centrifugal force actuated element being adapted to clutch with the other of said clutching structures in response to release of said releasable driving means at or above a predetermined speed of vehicle drive and when the rotative speeds of said clutching structures are substantially synchronized.

38. In a power transmission for a motor vehicle having a power driving shaft and a shaft driven therefrom and adapted to drive the vehicle, said driving and driven shafts being coaxially arranged for relative rotation, means for releasably driving said driven shaft from said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, means for drivingly connecting one of said clutching structures to one of said shafts for rotation at the same speed therewith at least just prior to engagement of said clutching structures and also subsequently to engagement of said clutching structures, and means including planetary gearing having a part thereof drivingly connected to the other of said clutching structures for driving the same at a speed different from that of the other of said clutching structures when said driving shaft drives said driven shaft through said releasable driving means.

39. The combination with a driving and a driven shaft, of a planetary transmission gearing for establishing an overspeed drive between said shafts, a centrifugally operated clutch for drivingly connecting said shafts through said planetary transmission, the members of said clutch being engageable when they are moving in substantial synchronism, one of the members of the clutch being drivingly connected through said planetary gearing with the driven shaft, the other member of the clutch being centrifugally movable and connected with the driving shaft, means for retracting said centrifugally moved member from engaging position when the speed thereof falls below a predetermined point, and restraining means for holding said clutch member against movement, the combined effect of said restraining means and retracting means being such as to restrain the centrifugally operated member of the clutch against movement until the speed thereof has mounted well above the critical point of the retracting means.

40. The combination with a driving and a driven shaft, of a planetary gearing for driving said driven shaft at a speed different from that of the driving shaft, an automatic clutch for connecting said shafts through said planetary gearing comprising one member drivingly connected with the driven shaft and having dogs thereon movable into engaging position, when the speed of said driven shaft reaches a predetermined point, and a second member normally driven when the clutch is disengaged at a greater speed than the dog-carrying member, the arrangement of said parts being such that when the speed of the two parts reach synchronism with the speed of the dog-carrying member driven at its critical speed the clutch will engage.

41. The combination with a driving shaft and a driven shaft, of a planetary gearing for driving said driven shaft at a different speed than that of the driving shaft and including a ring gear and a pinion carrier, an automatic clutch for establishing driving relation between the driving shaft and the driven shaft through said gearing and operable to establish such relation when the speed of the driven shaft rises above a predetermined point.

42. The combination with a driving shaft and a driven shaft, of a planetary gearing for driving said driven shaft at a higher speed than that of the driving shaft and including a ring gear and a pinion carrier, and an automatic clutch for establishing driving relation between said driving shaft and the driven shaft through said planetary gearing and operable to establish said relation when the speed of the driven shaft reaches a predetermined point.

43. The combination with a driving shaft and a driven shaft, of a planetary gearing for driving said driven shaft at a speed different from that of the driving shaft, of an automatic clutch for establishing driving relation between said shafts through said gearing, one of the members of said clutch being drivingly connected with the driven shaft and the other member of said clutch being adapted for driving connection with the driving shaft, said clutch being moved into engaging position when the speed of the driven shaft reaches a predetermined point and the members of the clutch being so constructed that engagement will not be effected until the two members of the clutch reach substantial synchronism, the driving relation between the shafts and their respective members of the clutch being such that when the critical speed of the driven shaft, at which the clutch is moved into engaging position, is reached the member connected with the driving shaft will be rotated faster than the member connected with the driven shaft so that in order to insure engagement of the clutch members the speed of the driving shaft will have to be reduced.

44. In a drive for a motor vehicle having a power driving shaft and a shaft driven therefrom and adapted to drive the vehicle, said driving and driven shafts being in axial alignment, overrunning clutch means intermediate said shafts for transmitting a releasable one-way direct drive therebetween, rotatable clutching structures one having a clutching element adapted to clutch with the other in response to substantially synchronized rotation of said clutching structures at or above a predetermined speed to provide a releasable positive driving connection therebetween, means for driving one of said clutching structures from said driving shaft, means for driving the other of said structures from said driven shaft, one of said driving means including a shiftable clutch device at all times drivingly connected with said driven shaft, at least one of said driving means including a gear train adapted to drive its associated clutching structure at a speed different from that imparted to the other of said structures when said driving shaft drives said driven shaft through said overrunning clutch, said overrunning clutch being rendered inoperative in response to clutching of said structures, and manually controlled means for shifting said clutch device for locking out said overrunning clutch to provide a direct two-way drive between said driving and driven shafts.

45. The combination with a driving shaft and a driven shaft, of a planetary gearing for driving said driven shaft at a different speed than that of the driving shaft, a clutch for establishing driving relation between said shafts through said gearing, means for preventing the engagement of the members of said clutch until the speed of one of the members thereof has reached a predetermined point, said clutch being so constructed that engagement will not be effected until the two members thereof approach substantially synchronism, and shiftable means within the control of the operator shiftable from one position thereof to another to directly connect said driving and driven shafts, said shiftable means when in the first said position thereof being adapted to drivingly connect said shafts through said planetary gearing and said clutch during said different speed drive.

46. The combination with a driving and a driven shaft, of a planetary transmission gearing for establishing an over-speed drive between said shafts, a centrifugally operated clutch for drivingly connecting said shafts through said planetary transmission, the members of said clutch being engageable when they are moving in substantial synchronism, one of the members of the clutch being drivingly connected through said planetary gearing with one of said shafts, the other member of the clutch being adapted for driving connection with the other of said shafts, one of said clutch members being centrifugally movable, means for retracting said centrifugally moved member from engaging position when the speed thereof falls below a predetermined point, and restraining means for holding said clutch member against movement, the combined effect of said restraining means and retracting means being such as to restrain the centrifugally operated member of the clutch against movement until the speed thereof has mounted well above the critical point of the retracting means.

47. In a power transmission, a driving shaft, a driven shaft, overrunning clutch means including driving and driven members thereof adapted for driving connection with said driving and driven shafts respectively for providing a one-way drive therebetween, clutch teeth carried by one of said overrunning clutch members, speed ratio driving means between said shafts and including driving and driven elements respectively adapted for driving connection to said shafts, a clutch operable to establish driving relationship between said elements through the speed ratio driving means, one of said elements having clutch teeth, a clutch device driven by one of said shafts and having teeth at all times engaging the clutch teeth of said element, and means for shifting said clutch device to engage the teeth thereof with the teeth of said overrunning clutch member.

48. In a transmission, the combination with a driving shaft and a driven shaft, of a planetary transmission for driving said driven shaft at a greater speed than the driving shaft, a clutch for connecting said shafts through said gearing, one member of said clutch being drivingly connected with the driven shaft through said gearing and when driven from said driven shaft being driven at a speed below that of the other member of the clutch, the other member of the clutch being drivingly connected with the driving shaft and biased in a direction to engage with the first member under the action of centrifugal force, retracting means for said centrifugally operated member for opposing said bias and moving the same out of engaging position, and restraining means for holding said centrifugally operated member from moving in an engaging direction, the sum of the restraining effort of said retracting means and restraining means being sufficient to prevent the movement in an engaging direction of the centrifugally operated member until the speed of the driven shaft when driven directly from the driving shaft has reached a predetermined point, and the retracting effort of the retracting means being such as to permit centrifugal force to maintain said clutch member against the force of said retracting means until the speed of the centrifugally operated clutch member has fallen below a predetermined point lower than said first-mentioned point.

49. In a transmission, the combination with a driving shaft and a driven shaft, of a transmission gearing for driving said driven shaft at a greater speed than said driving shaft, means for directly connecting said shafts to establish a one to one drive between said shafts, a clutch for connecting said driving and driven shafts through said gearing, including one member driven through said gearing from said driven shaft, and a centrifugally operated clutch member connected with and responsive to the speed of said driving shaft independently of said gearing when the direct connection between the driven shaft and driving shaft is broken, retracting means for biasing said centrifugally operated clutch member into disengaging position, restraining means for holding said centrifugally operated member in its disengaged position, the sum of the efforts of said retracting and said restraining means being such as to prevent the movement of said centrifugally operated clutch member under centrifugal force until the speed thereof reaches a predetermined point, said restraining means at said point releasing said centrifugally operated member to permit the same to move into engaging position, the retracting effort of said retracting means being insufficient to overcome said centrifugal bias until the speed of said centrifugally operated member has dropped below the synchronization point of the two members of the clutch.

50. In a vehicle drive, a power driving shaft, a driven shaft aligned with said drive shaft, means for establishing a direct one-way drive between said shafts including cooperating overrunning clutch members adapted to be driven by said shafts respectively, one of said overrunning clutch members having a gear driven therewith, a clutch element, a gear train for driving said clutch element from the first said gear, a second clutch element adapted to drivingly engage the first said clutch element, the other of said overrunning clutch members having a portion extended therefrom for at all times driving said second clutch element therewith, said extended portion surrounding said driving shaft, and means for driving said extended portion and the last said overrunning clutch member at all times directly from said driving shaft.

51. The combination with a driving and a driven shaft, of a planetary gearing for driving said driven shaft at a different speed than that of the driving shaft, a clutch for establishing driving relation between said shafts through said gearing, means for preventing the engagement of the members of said clutch until the speed of one of the members thereof has reached a predetermined point, said clutch being so constructed that engagement will not be effected until the two members thereof approach substantially synchronism, shiftable means within the control of the operator drivingly connecting said shafts through said planetary gearing and clutch during said different speed drive and shiftable to directly connect said driving and driven shafts, and means providing continuous drive of said shiftable means with said driven shaft.

52. The combination with a driving shaft and a driven shaft, of a gearing for driving the driven shaft at a different speed than that of the driven shaft, a clutch for establishing driving relation between said shafts through said gearing comprising a dog-carrying member having centrifugally operated dogs mounted thereon and means for biasing said dogs in disengaging position until the speed of said member reaches a predetermined point and a dog engaged clutch member, the dogs and the dog engaged member being so related that they will engage when the parts are substantially in synchronism, the dog engaged member being driven when the clutch is disengaged, at a greater speed than the dog carrying member, shiftable means within the control of the operator drivingly connecting said shafts through said gearing and clutch during said different speed drive and shiftable to directly connect said driving and driven shafts while maintaining the relationship of the gears constant, and means providing continuous drive connection between said shiftable means and said driven shaft.

53. The combination with a driving shaft and a driven shaft of a gearing for driving the driven shaft at a different speed than that of the driving shaft, a clutch for establishing driving relation between said shafts through said gearing comprising a dog-carrying member having centrifugally operated dogs mounted thereon and means for biasing said dogs in disengaged position until the speed of said member reaches a predetermined point and a dog engaged clutch member, the dogs and the dog engaged member being so related that they will engage when the parts are substantially in synchronism, shiftable means within the control of the operator drivingly connecting one of said shafts through said gearing and clutch during said different speed drive and shiftable to directly connect said driving and driven shafts while maintaining the relationship of the gears constant, and means providing continuous drive connection between said shiftable means and said driven shaft.

WILLIAM T. DUNN.